Figure 1:
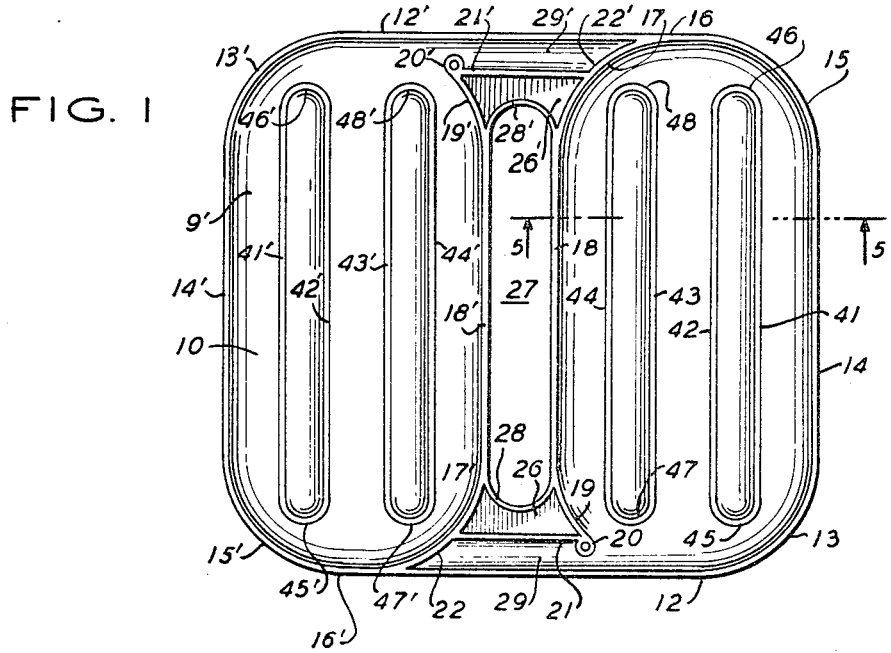

Oct. 4, 1966   W. M. EMERY   3,276,047
TWIN-REST SEAT CUSHION
Filed March 8, 1965   2 Sheets-Sheet 1

INVENTOR
William M. Emery

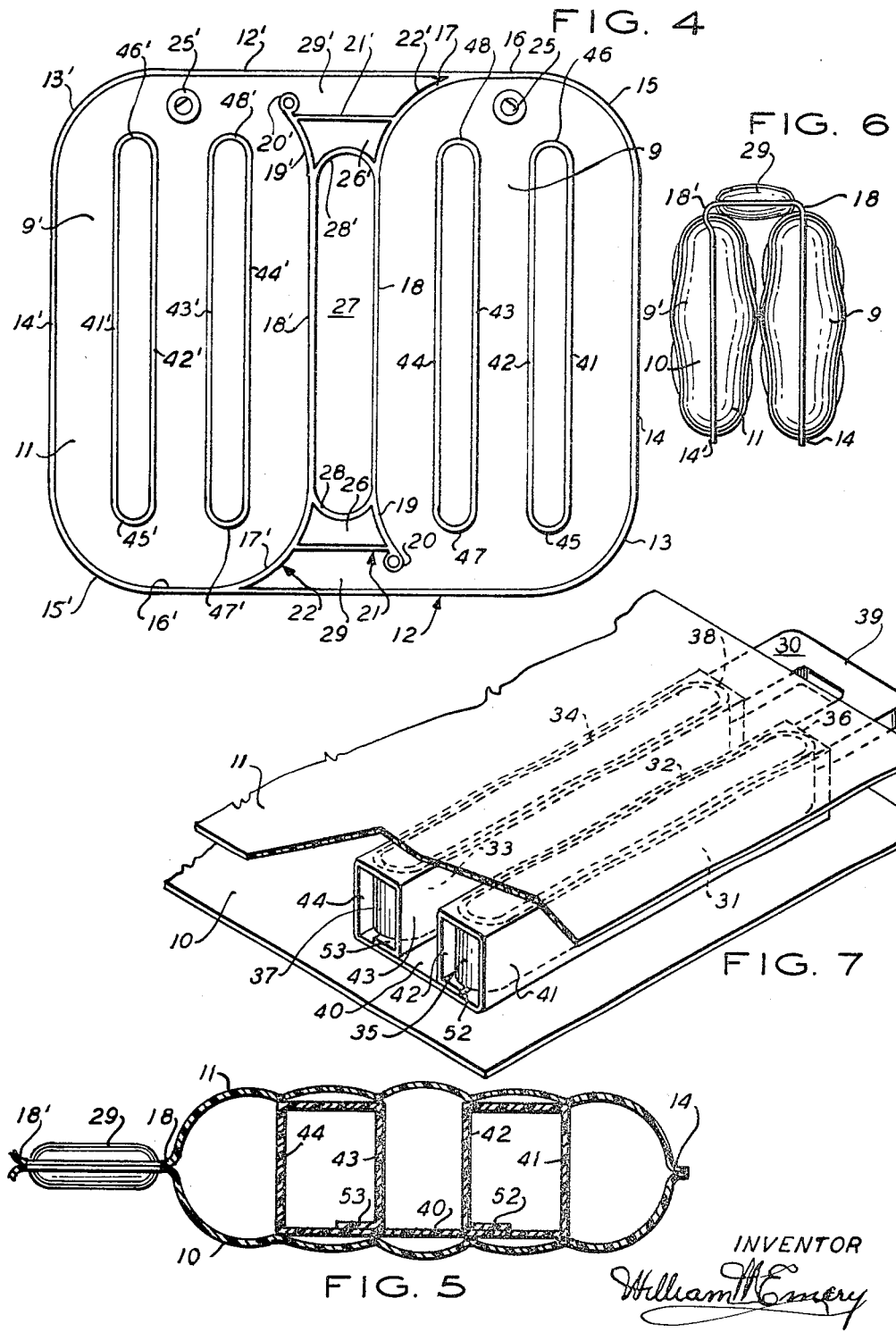

United States Patent Office 3,276,047
Patented Oct. 4, 1966

3,276,047
TWIN-REST SEAT CUSHION
William M. Emery, 44 Pittsford Way,
New Providence, N.J.
Filed Mar. 8, 1965, Ser. No. 437,819
9 Claims. (Cl. 5—349)

My present invention refers to a twin-rest seat cushion. While it can be made of various inflatable materials, it is especially designed for successful use with vinyl rather than rubber because the former produces weaker seals requiring my unique construction to provide sufficient strength by minimizing the linear load on the seal. There is probably no more severe use for inflatable vinyl than a seat cushion of substantial thickness for use in wheel chairs which may support the weight of roughly one pound per square inch for up to 16 hours a day. Other designs have failed because they have not provided seals of sufficient total linear length so that the total strain thereon such as 160 pounds when divided by the total number of inches of linear seal, the amount of pressure per linear inch of seal will be reduced to a minimum such as ½ to ⅞ of a pound which the seal can readily stand. It is also important that ribs or internal restraining ties should be closely adjacent and parallel to the peripheral seals and to each other because as weight is applied to the cushion the confined air tends to push against and toward the peripheral seal in a bulbous manner unless restrained by said ribs.

In fact unrestrained inflatables tend to take a spherical or cylindrical shape. However, an inflatable, restrained by a plurality of closely adjacent ribs in accord with my invention can be normally flat and will retain approximately the same height whether free or under load even when inflated just by mouth. This is partly because while a bulbous top initially offers only a minimum of weight supporting area, a top flattened as I propose immediately provides a weight supporting area of maximum area and also the user does not need to lift himself so high for the initial contact. This constant height is very helpful and desirable for the invalid users as well as providing a unique and better appearance.

An example of the non-constant height is found in the much used ring cushion.

While not suitable for a seat cushion, another example of insufficient and conventional single rib ribbing is shown in my Patent 2,728,926 of January 3, 1956, which when made of the identical material as used in my twin-rest seat cushion will not stand up as a seat cushion because of lack of ribbing of the construction herein described. This results in large unrestrained bulbous areas creating forces, when sat on, too great for the peripheral seals to ultimately withstand. Another example of conventional ribbing is found in a few air mattresses which if durable are usually made of heavier material. This is despite the fact that their normal and prolonged load per square inch is far less than a seat cushion because the weight of the user is distributed horizontally and if one were to sit or even walk on such a device there is plenty of unloaded areas into which the air immediately below the foot or buttocks can go so the internal or localized pressures are not materially increased. They do not need nor do they attempt to provide as flat or as closely ribbed a top as my seat cushion.

It is also desirable that a seat cushion should be conveniently foldable like a book without deflating and yet maintain a substantially positive spacing and separation of its halves when open to provide a valley for the comfort of users with hemorrhoids and the like.

Having two entirely separate left and right halves, air cannot pass from one to the other. By left half I mean a half of substantially the same volume capacity, shape, profile and resiliency of wall, etc. as the other half and suitable for supporting the left thigh or left half of the buttocks rather than part of each, and by a right half I refer to an adjacent like part to provide a compact area to support the right half of the buttocks or right thigh. This separate and identical resiliency avoids a most undesirable and, to an invalid, a dangerous unbalance or rocking action.

Accordingly, included in the objects of my invention are: (1) to provide a twin-rest seat cushion that will be durable although made of vinyl by means of concentrating in a novel manner a large total of linear length of ribbing and seals into a small area; (2) to provide two substantially flat inflatable halves linked together so the cushion can be folded together like a book while maintaining their normal spacing when open; (3) to provide two symmetrical identical adjacent parts of equal resiliency and separately inflated so that air cannot pass from one to the other to unbalance the user; and (4) to provide unique and closely adjacent vertical spacing ribbing to space and tie the upper and lower surfaces together to produce a flat surface for the seat cushion and one which gives a substantially constant height whether the cushion is in use or not in contradistinction to a series of cylindrical tubes or long arcs.

Figure 2:
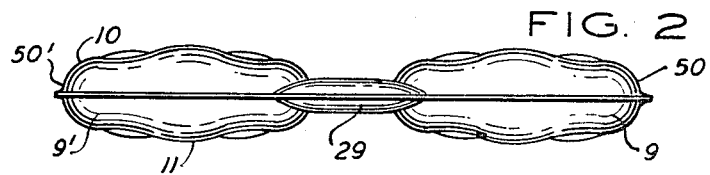
Figures 3, 8:
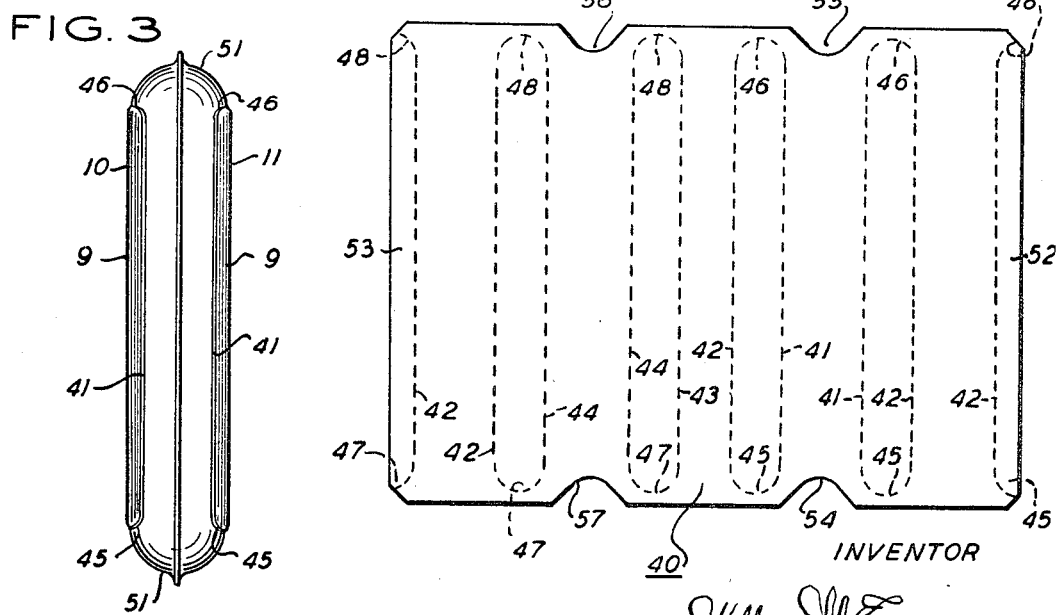

Other objects and their accomplishment will be appreciated from the following description, claims and the accompanying drawings in which, FIG. 1 is a plan view of one side of my rectangular twin-rest seat cushion when inflated, FIG. 2 is an elevation of either of opposite ends of FIG. 1, FIG. 3 is an elevation of either the other ends of FIG. 1, FIG. 4 is a plan view of the other or valve side of FIG. 1, FIG. 5 is a sectional view taken along line 5—5 of FIG. 1, FIG. 6 is an end elevation like FIG. 2 but shown folded, FIG. 7 is a fragmentary view to illustrate the method of heat sealing the ribbing of one of the identical halves, and, FIG. 8 is a plan or stretched out view of the single sheet of material from which the quadruple ribs are made with seal locations shown diagrammatically in broken lines.

As shown in FIGS. 1 to 7, my twin-rest seat cushion consists of two originally rectangular exterior sheets 10 and 11 of vinyl hermetically sealed together, one half of which is sealed into an elongated separate compartment 9 by peripheral seals 12 to 22, and the other half 9' by seals 12' to 22', each half being separately inflated through valves 25 and 25' respectively. Areas 26 and 26' as shown are not inflated and area 27 is a hole bounded by seals 18, 18', 28, and 28'. Seals 12 to 16; 12' to 16'; 18 and 28; 18' and 28' are sealed with a beaded tear-seal which allows the tearing away of any excess of the originally rectangular vinyl sheets 10 and 11 after the sheets are sealed together as described leaving the round corners 13 and 15 and 13' and 15' and the elongated hole 27.

When inflated, areas 29 and 29' have a relatively small cross section as shown in FIGS. 2, 5 and 6, but do lend sufficient stiffness to space apart the separate halves 9 and 9'. Areas 26 and 26' with a slight variation in the sealing die could also be inflated if necessary.

If this were the total seal and there were no plurality of closely adjacent vertically spacing ribs such as 41 to 44 and 41' to 44' as will hereafter be described in detail, each half 9 and 9' when inflated would become substantially bulbo-cylindrical with a diameter equal to twice the distance from 14 to 18 divided 3.14 which would not be about twice the present restrained height and under the weight of the average user this initial height would squash down to about the flattened height shown in FIGS. 2 and 3, and the unrestrained internal pneumatic forces would continually try to tip the user the instant he would lean to one side or be subject to centrifugal force such as in an automotive turn, this occurs with a pneumatic ring cushion. Furthermore with only the peripheral seal just described the pressure under continued load would be such that the peripheral seal would soon leak or give way.

To provide two substantially flat twin rests and also essential added strength to resist bursting and leakage, I have devised a unique method of quadruple parallel one piece closely adjacent and vertical ribbing applied preliminary to make the final peripheral seal.

By ribs or ribbing, I refer exclusively to ribs which consist of separate ties to vertically space or normal to the sheeting such as 10 and 11. Such ties or ribs are in direct contrast to the sealing of the top and bottom sheets directly to each other which produces a very different, cheaper, weaker and distorted result.

As shown in FIG. 7, two identical sealing forms, 30, one for compartment 9 and another (not shown) for 9' are used. They consist of vertical spacing walls 31, 32, 33 and 34, providing sealing surfaces integral therewith and bearing similar numerical identification. Walls 31 and 32 are joined by rounded ends 35 and 36. Walls 33 and 34 are likewise joined by rounded ends 37 and 38. Ends 36 and 38 are spaced and aligned so the walls 31 to 34 are equally spaced and kept parallel by handle 39.

A substantially rectangular sheet of vinyl 40 shown in FIG. 8 is wrapped around form 30 after placing the form in the middle of sheet 40 and placing rib-section 41 adjacent to wall 31 and rib section 44 adjacent to wall 34. As the wrapping is continued rib section 42 is adjacent to the wall 32 and rib section 43 is adjacent to wall 33, and the ends 52 and 53 of the vinyl sheet 40 fold under walls 32 and 33 respectively. It will be noted that there is a double thickness of sheet 40 under walls 32 and 33 and a single thickness under walls 31 and 34. When the sealing surfaces of walls 31 to 34 are machined flat and of substantially uniform height, due allowance is made for this single and double thickness of material. The four ribs are actually comprised of two pairs symmetrically and oppositely wrapped on opposite sides of a center line between the pairs. This is typical of what I refer to as symmetrical.

Before the final seals 12 to 22 and 12' to 22' are made, two forms 30 after being wrapped in vinyl sheets similar to 40 are positioned carefully on opposite halves of sheet 10. Then sheet 11, into which valves 25 and 25' have been previously sealed, is positioned carefully on top of forms 30 and 30'.

Ribs 41 to 44 and also 41' to 44' (not shown) and also seals 45 to 48 made by 35 to 38 and 45' to 48' made by 35' and 38' respectively are sealed internally to sheets 10 and 11 as shown somewhat diagrammatically in FIGS. 5 and 7 and in FIGS. 1 and 4 the seals are indicated by the same numerals. Seals being considered part of the rib are similarly numerated in FIGS. 1 and 4.

Now, forms 30 and 30' can be removed and the final seals 12 to 22 and 12' to 22' are made simultaneously with a conventional type of tear seal die as previously described. Using pressure and high frequency current at the line of seal for the ribs and the final seal the pressure and the heat of sealing may reduce the thickness of the vinyl about 60% so the rib seals, etc., 41 to 48 and 41' to 48' are clearly seen much as shown on FIGS. 1 and 4.

While some variation may occur in the preferred form, the spacing between 14, 41, 42, 43, 44 and 18 may well be substantially equal or may be proportioned to the internal load under use. The rounded rib ends 35 to 38 are positioned relative to the profile curve 50 and 50' of the inflated pillow suggested in FIG. 2 and 51 and 51' shown in FIG. 3, so that the load on the ends of the ribs is applied gradually to avoid a sudden focus of forces that might tear them loose endwise as normally the end of a rib is its weakest point. Due to the rounding adjacent to the seal at the ends, the ribs at extreme ends of curves 45 to 48 are always loose not only because the rib is vertically longer because of 45 to 48 but also because of the rounding profile of the cushion at 45 and 46 shortens the distance between sheets 10 and 11 at these points.

When air is injected by mouth through valve 25 then only compartment 9 is inflated and the ribs 31 to 34 result in a restrained and substantially flat top with a thickness of say 2 to 3 inches, except for section 29 which may have a cross section of about ¾ of an inch and section 26 which may not be inflated at all end of course area 27 which is a hole.

When air is injected likewise into valve 25' corresponding parts are inflated and the twin-rest seat cushion appears as shown in FIGS. 1 to 4, and may be conveniently folded for carrying without deflating as shown in FIG. 6.

To clarify the description of my unique method of attaining quadruple and closely adjacent ribbing from a single piece of material, I have added FIG. 8 which shows a rectangular piece of vinyl 40 on which I have superimposed broken lines to suggest diagrammatically the approximate positions where seals may later occur. Because the vertical height of the ribs in the preferred embodiment is greater than the distance between them, conventional methods of ribbing inflatables is not practical and for the same reason, the end edges of the outer ribs 41 to 44 when crushed or folded flat for the final seals 12 to 20 could extend toward the adjacent final seals to overlap or interfere with said seals such as 13, 19 and 20. Accordingly, it is necessary to have in sheet 40 notch 54 to avoid said interference with seal 13; notch 55 to avoid seal 15; notch 56 to avoid seal 17; and notch 57 to avoid seals 19 and 20. These notches 54 to 57 are not shown in the embodiment of FIG. 7, but are a helpful production refinement and a safety factor to avoid occasional rejects.

The unbalance and a tipping tendency unfortunately common to all inflatable seat cushions has been overcome in my invention by a meritorious combination of several structural elements never before combined in the art in one seat cushion, i.e., (1) two separate and similar right and left halves to independently and equally resiliently support the left and right sections of the buttocks or left and right thighs respectively; (2) separate inflating valves for each half, (3) flat, restrained weight supporting areas of substantially constant height and shape and (4) quadruple one piece vertical ribs closer together than they are high and also positioned parallel to each other continuously and substantially the full length of each half in the same direction the thighs would normally be positioned.

In the claims where the term "vertical" is used I assume that the seat cushion and the exterior sheets are substantially horizontal. A broader expression such as ribs normal to said exterior sheets is considered equivalent and interchangeable therewith.

Furthermore, may unique flat top quadruple ribbing makes possible a durable seat cushion made out of vinyl that would otherwise by impossible.

While variations in structure, application and materials may be made without departing from the spirit or scope of my invention and claims, including a very restricted pneumatic interconnection between the two halves, such claims and invention are restricted to inflatables.

I claim:

1. An inflatable seat cushion comprising exterior plastic sheeting hermetically sealed directly together, separately inflated and substantially similar right and left halves providing surfaces for supporting the right and left thighs respectively and approximately the width and length thereof, a sizable elongated opening between said halves, smaller inflated parts pneumatically connected each to one of said halves positioned near the ends of said elongated opening to provide a pneumatic stiffness to space said halves apart and to hinge them together, and quadruple and closely adjacent vertical rib means made from a separate sheet of plastic for each of said cushion halves, each of said quadruple rib means being folded symmetrically in a reversing fashion and sealed internally of each of said cushion halves to tie said exterior sheeting together for limited separation by said vertically disposed ribs when inflated and to restrain each of said thigh supporting surfaces to substantial flatness, said ribs being substantially the full length of each half and disposed in the same direction as the thighs of the user.

2. An inflatable seat cushion comprising top and bottom plastic sheeting hermetically sealed directly together, two elongated inflatable and substantially similar right and left halves providing equally resilient weight supporting surfaces each suitable for separately supporting the right and left thighs respectively, an uninflated valley there between, smaller inflated parts penumatically connected each to only one of said halves positioned near the ends of said valley to space said halves apart pneumatically and to hinge them togther, and a plurality of substantially vertical parallel ribs made from an additional sheet of plastic sealed longitudinally and internally of each half to said top and bottom sheeting to tie said top and bottom sheets together when separated by inflation to produce substantially flat exterior top and bottom surfaces in said thigh supporting halves.

3. A cushion comprising exterior plastic sheeting hermetically and peripherially sealed together, two separately inflatable and substantially similar elongated rectangular halves, a valley there between, lesser inflatable parts pneumatically connected each to one of said halves and positioned across the ends of said valley to space said halves apart pneumatically and to hinge these together, at least one pair of substantially vertical and parallel ribs extending between said external sheeting and sealed internally of each of said halves made from an additional sheet of plastic said rib pairs being disposed longitudinally in each of said elongated halves, and curved sealed ends substantially joining said vertical ribs adjacent to said peripherial seal.

4. An inflatable substantially square seat cushion comprising top and bottom plastic sheeting hermetically sealed together, a valley positioned on the center line thereof substantially identical right and left halves formed thereby substantially pneumatically disconnected from each other and suitable for the support of right and left thighs of the user respectively, when inflated, smaller inflatable parts pneumatically connected each to only one of said halves positioned near and across the ends of said valley to space said halves apart pneumatically, and two separate valves one associated with each half through which each half may be inflated and deflated, the effect of said pneumatically separated halves being to laterally stabilize the user and the avoidance of side rocking.

5. An inflatable seat cushion comprising two exterior plastic horizontal sheets hermetically sealed together, two halves substantially similar in size and elongated to support and conform to right and left thighs of a user respectively and four substantially parallel vertical ribs more closely adjacent than their vertical height and made from additional sheet plastic folded and sealed internally and longitudinally of each of said halves and disposed to tie said exterior sheets together when inflated to maintain in said halves substantially flat tops and bottoms.

6. A seat cushion comprising exterior plastic sheeting peripherally sealed together, two separately inflatable and substantially similar elongated rectangular halves with their elongated sides adjacent and parallel, at least one pair of substantially vertical and parallel ribs extending between said external sheeting and sealed internally thereto and made from an additional sheet of plastic for each of said halves, said rib pairs being disposed longitudinally in each of said elongated halves, and curved seals substantially joining and terminating the said internal sealing at the ends of each pair of said elongated vertical ribs to reduce and make gradual the initial strain on the ends of said vertical ribs when said seat cushion is inflated.

7. An approximately square inflatable seat cushion having right and left elongated similar halves separately inflatable and suitable to support the right and left thighs respectively when placed longitudinally of said halves, comprising a lower exterior sheet of inflatable material, an upper exterior sheet of similar material, said sheets being peripherally sealed together, two separate intermediate sheets, U-shaped rib means with vertical legs formed from each of said intermediate sheets and disposed at least one in each of said halves parallel to the elongated sides of each half, sealing means to join the upper ends of said legs to one of said exterior sheets, and similarly spaced apart sealing means to join the bottom of said U-shaped rib legs to the other exterior sheet thus producing at least one pair of vertical ribs in each of said halves to limit the spacing of said exterior sheets when the halves of said cushion are separately inflated and positioned horizontally.

8. An inflatable cushion comprising a first exterior horizontal sheet, a second horizontal exterior sheet, means to fuse the periphery of said exterior sheets together, an intermediate sheet folded to provide a U-shaped rib having vertical legs fused at their top ends to said first sheet, and similarly spaced apart two substantially parallel fused joints to seal the bottom corners of said U to the second exterior sheet thus retaining the vertical characteristic of said rib legs.

9. An inflatable cushion comprising a lower exterior sheet, an upper exterior sheet, means to fuse the periphery of said exterior sheets together, an intermediate sheet folded symmetrically reversed to provide quadruple spaced apart vertical ribs normal to said exterior sheets, parallel fused joints sealing four spaced apart tops of said vertical ribs to said top exterior sheet and substantially similar spaced fused joints sealing the four bottoms of said vertical ribs to said bottom sheet to provide four substantially vertical spaced apart ties limiting the separation of said exterior sheets when said cushion is inflated.

References Cited by the Examiner

UNITED STATES PATENTS

| | | | |
|---|---|---|---|
| 628,871 | 9/1901 | Hogan et al. | 5—348 |
| 2,625,209 | 1/1953 | Harrison et al. | 5—348 X |
| 2,843,181 | 7/1958 | Paschen | 297—114 |
| 2,926,720 | 3/1960 | Gosman | 5—350 X |
| 3,112,956 | 12/1963 | Schick et al. | 5—348 X |

FRANK B. SHERRY, *Primary Examiner.*

A. M. CALVERT, *Assistant Examiner.*